Figure 1:
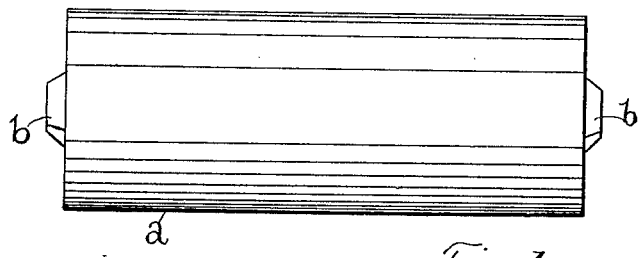

No. 887,507. PATENTED MAY 12, 1908.
G. B. NORGRAVE.
GLAZING GLASS OR STONE.
APPLICATION FILED APR. 28, 1906.

2 SHEETS—SHEET 1.

Witnesses.
E. H. Garrett
J. Murphy

Inventor.
George B. Norgrave
by Jas. H. Churchill
Atty.

No. 887,507. PATENTED MAY 12, 1908.
G. B. NORGRAVE.
GLAZING GLASS OR STONE.
APPLICATION FILED APR. 28, 1906.

2 SHEETS—SHEET 2.

Witnesses.
C. H. Garnett
J. Murphy

Inventor.
George B. Norgrave
by Jas. H. Churchill
Atty.

UNITED STATES PATENT OFFICE.

GEORGE B. NORGRAVE, OF PEABODY, MASSACHUSETTS, ASSIGNOR TO PEABODY LEATHER MACHINERY COMPANY, OF PEABODY, MASSACHUSETTS, A CORPORATION OF MAINE.

GLAZING GLASS OR STONE.

No. 887,507.  Specification of Letters Patent.  Patented May 12, 1908.

Application filed April 28, 1906. Serial No. 314,140.

*To all whom it may concern:*

Be it known that I, GEORGE B. NORGRAVE, a citizen of the United States, residing in Peabody, in the county of Essex and State of Massachusetts, have invented an Improvement in Glazing Glass or Stone, of which the following description, in connection with the accompanying drawings, is a specification, like letters on the drawings representing like parts.

This invention relates to a cylindrical glass or stone of that class commonly employed in machines for glazing and polishing leather.

A glazing glass or stone as now commonly constructed consists of a block of glass cylindrical in shape, of uniform diameter throughout its length and provided with substantially smooth ends. The glazing glass in operating on the leather is, in time, worn flat at the point where it engages the leather, which necessitates turning the glass in its holder to bring a circular or round portion of the glass into operative position. The turning referred to is continued as long as a round or circular portion of the periphery of the glass remains to be presented to the leather. In time the glazing glass or stone becomes worn to such extent as to form longitudinal facets on the periphery of the glass, at which time, the glass is removed from its holder or head of the glazing machine and reground.

As now commonly practiced, the glazing glass or stone is placed radially on the upper surface of a grinding stone mounted on a vertical axis, so as to revolve in a horizontal plane. The glass or stone to be reground is placed radially on the grinding stone and bears against a radially disposed bar or fence movable with the grinding stone. The glass or stone is turned slowly by the operator in the same direction that the grinding stone is moving. It will thus be seen that the end of the glazing glass or stone farthest from the center of the grinding stone travels much farther than the end or part near or toward the center of said grinding stone, with the result that the glass or stone is ground tapering or conical with the smaller end nearer the center of the grinding stone. This is highly objectionable owing to the difficulty experienced in accurately adjusting the glass or stone in its head or holder, so that the stone will bear upon the bed or the material thereon throughout its entire length. As a result of the imperfect adjustment of the glass or stone in its holder, the leather is subjected to more or less severe treatment at the point of greater diameter of the glass or stone than at the narrower diameter, because the portion or end of greater diameter necessarily embeds itself in the leather, thereby causing a series of streaks to appear in the leather as the latter is shifted upon its bed.

The present invention has for its object to provide a glazing glass or stone of novel construction as will be described, whereby the above mentioned faults are avoided and whereby the cost and the time required in regrinding may be materially reduced.

Figure 2:
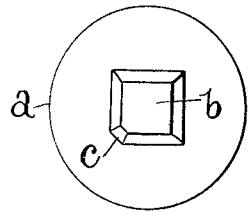
Figure 3:
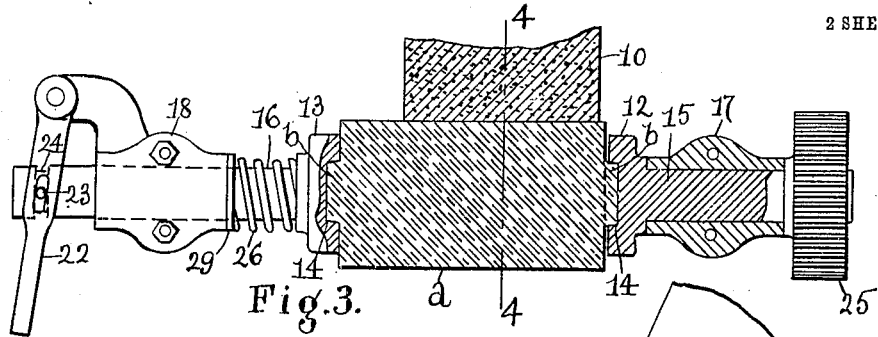
Figure 4:
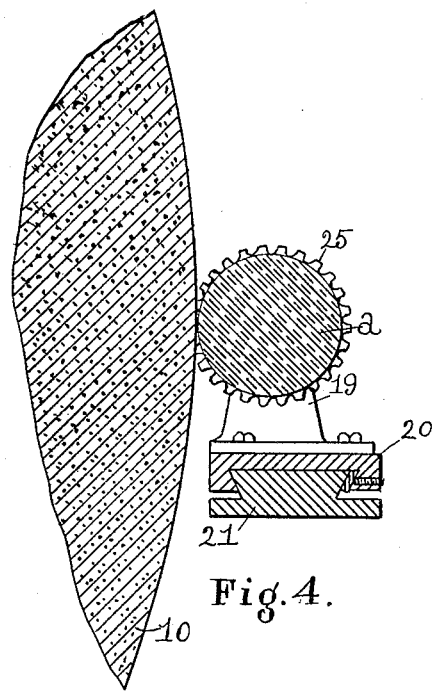

Figure 1 represents in side elevation a glazing glass or stone embodying this invention, and Fig. 2, an end view of the glass or stone shown in Fig. 1. Fig. 3, a detail in section showing the glazing glass and a portion of the grinding stone. Fig. 4, a sectional detail on the line 4—4, Fig. 3, and Fig. 5, a detail to illustrate the method of grinding now commonly employed.

Referring to the drawings *a* represents a cylindrical block of glass or stone, which, in accordance with this invention, is provided at its opposite ends with means by which the glass or stone may be accurately positioned in a chuck or holding device of any suitable or desired construction and by means of which the glass or stone can be fed or moved across the periphery of a grinding stone 10 mounted to revolve on a horizontal axis, so as to subject the entire length of the glass or stone to the action of the grinding stone, suitable provision being made so that the chuck and the glass or stone can be revolved by the operator or by power.

In the present instance one form of positioning means is herein shown, which consists of substantially square or angular projections or nubs *b* extended from the opposite ends of the cylinder *a*. Provision is made for insuring the glass or stone *a* occupying the same position in the chuck or holder each time the glass or stone is reground, and this may be accomplished by providing one of the nubs or projections *b* with a guide or marking device, shown in the present instance as a cut-away portion *c* at one of the corners of said nub.

In Fig. 3, one form of chuck or holding device is shown, which consists of two heads 12, 13, having sockets 14 for the reception of the nubs *b*, and studs or shafts 15, 16, extended from said heads and mounted to turn in bearings 17, 18, supported by uprights 19, only one of which is shown in Fig. 4, said uprights being erected upon a plate 20 dove-tailed to slide on a support 21.

Movement of the glazing stone $a$ longitudinally and across the periphery of the grinding stone 10 may be effected in any suitable manner as for instance by the lever 22 having a stud 23 which enters an annular groove 24 in the stud or shaft 16. The glazing stone $a$ is detachably held between the chucks by the spring 26 encircling the shaft 16 between the head 13 and a collar 29 loose on said shaft. Rotary movement may be imparted to the glass by the gear 25 on the shaft 15.

From the above description it will be seen that the glass or stone may be ground and reground accurately so as to maintain it of the same diameter throughout its length, thereby enabling it to be accurately fitted to its holder in a minimum time and so that it will bear evenly on the work, thereby avoiding streaking the leather. Furthermore the time required to grind the glass or stone is reduced to a minimum.

I have herein shown one form of means for enabling the glass or stone to be mounted in a chuck or holder, so as to enable the glass or stone to be ground for its entire length on the periphery of a grinding stone revolving on a horizontal axis, but it is not desired to limit the invention in this respect, as the ends of the cylindrical glass or stone may be provided with the converse of the projections or nubs $b$.

Figure 5:
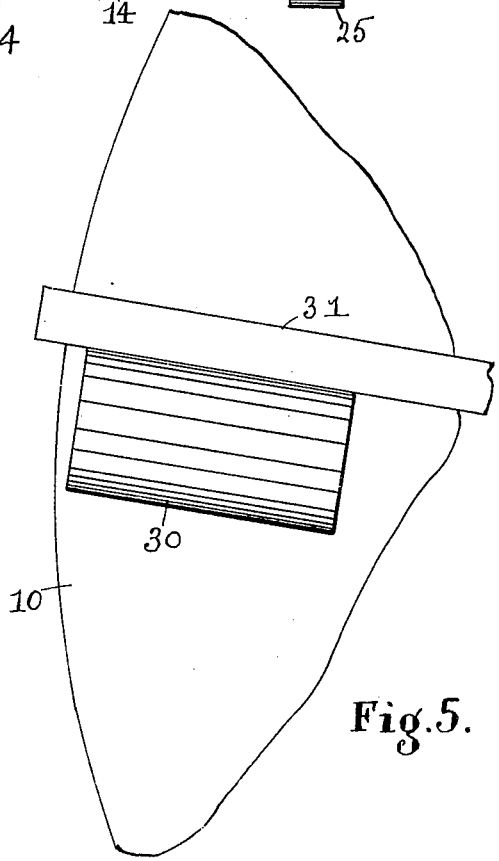

In Fig. 5 I have illustrated the method of grinding now commonly practiced in which the glass 30 is held against a radial bar or fence 31 on the grinding stone 10 which is mounted to revolve on a vertical axis.

Claim.

As a new article of manufacture, a one piece glazing glass or stone provided with projections or nubs integral therewith and extended from its opposite ends, and one of which is provided with a cut-away portion at one of its corners, substantially as described.

In testimony whereof, I have signed my name to this specification in the presence of two subscribing witnesses.

GEORGE B. NORGRAVE.

Witnesses:
JAS. H. CHURCHILL,
J. MURPHY.